United States Patent
Paukner et al.

(10) Patent No.: US 10,815,861 B2
(45) Date of Patent: *Oct. 27, 2020

(54) EXHAUST GAS AFTERTREATMENT SYSTEM AND METHOD FOR EXHAUST AFTERTREATMENT OF AN INTERNAL COMBUSTION ENGINE

(71) Applicant: Volkswagen Aktiengesellschaft, Wolfsburg (DE)

(72) Inventors: Stefan Paukner, Wolfsburg (DE); Falk-Christian Baron Von Ceumern-Lindenstjerna, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 55 days.

This patent is subject to a terminal disclaimer.

(21) Appl. No.: 16/224,167

(22) Filed: Dec. 18, 2018

(65) Prior Publication Data

US 2019/0195115 A1 Jun. 27, 2019

(30) Foreign Application Priority Data

Dec. 21, 2017 (DE) ........................ 10 2017 130 886

(51) Int. Cl.
*F01N 3/023* (2006.01)
*F01N 3/025* (2006.01)
(Continued)

(52) U.S. Cl.
CPC ......... *F01N 13/0093* (2014.06); *F01N 3/023* (2013.01); *F01N 3/025* (2013.01);
(Continued)

(58) Field of Classification Search
CPC .......... F01N 3/023; F01N 3/025; F01N 3/035; F01N 3/101; F01N 3/2033; F01N 3/204;
(Continued)

(56) References Cited

U.S. PATENT DOCUMENTS

2011/0167802 A1 7/2011 Bruck
2012/0315192 A1* 12/2012 Tsujimoto ............. F01N 3/0236
422/109
(Continued)

FOREIGN PATENT DOCUMENTS

DE 102 21 174 A1 1/2004
DE 10 2008 036 127 A1 2/2010
(Continued)

OTHER PUBLICATIONS

Extended European Search Report (EESR) for European Patent Application No. 18213810.7, dated Mar. 11, 2019.
(Continued)

*Primary Examiner* — Audrey K Bradley
(74) *Attorney, Agent, or Firm* — Pearl Cohen Zedek Latzer Baratz LLP

(57) ABSTRACT

The invention relates to an exhaust gas aftertreatment system for an internal combustion engine, in particular for a gasoline engine that is spark-ignited by means of spark plugs. A four-way catalytic converter and at least one three-way catalytic converter are situated in an exhaust gas system that is connected to an outlet of the internal combustion engine. An exhaust gas burner with which hot exhaust gas is introducible into the exhaust gas system directly downstream from the four-way catalytic converter is provided at an exhaust duct of the exhaust gas system. The exhaust gas burner is supplied with fresh air by a secondary air pump. The invention further relates to a method for
(Continued)

exhaust aftertreatment of an internal combustion engine having such an exhaust gas aftertreatment system.

9 Claims, 4 Drawing Sheets

(51) Int. Cl.
    *F01N 3/035* (2006.01)
    *F01N 3/10* (2006.01)
    *F01N 3/20* (2006.01)
    *F01N 9/00* (2006.01)
    *F01N 11/00* (2006.01)
    *F01N 13/00* (2010.01)
    *F01N 3/30* (2006.01)
    *F02D 41/02* (2006.01)

(52) U.S. Cl.
    CPC ............. *F01N 3/035* (2013.01); *F01N 3/101* (2013.01); *F01N 3/204* (2013.01); *F01N 3/2033* (2013.01); *F01N 3/30* (2013.01); *F01N 9/002* (2013.01); *F01N 11/00* (2013.01); *F01N 13/009* (2014.06); *F02D 41/029* (2013.01); *F01N 2240/14* (2013.01); *F01N 2250/02* (2013.01); *F01N 2250/04* (2013.01); *F01N 2250/06* (2013.01); *F01N 2560/025* (2013.01); *F01N 2560/14* (2013.01); *F02D 2200/0812* (2013.01)

(58) Field of Classification Search
    CPC . F01N 3/30; F01N 9/002; F01N 11/00; F01N 13/009; F01N 13/0093; F01N 2240/14; F01N 2250/02; F01N 2250/04; F01N 2250/06; F01N 2560/025; F01N 2560/14
    See application file for complete search history.

(56) References Cited

U.S. PATENT DOCUMENTS

2013/0008162 A1    1/2013    Ruona et al.
2013/0327023 A1    12/2013    Schlueter et al.
2017/0014766 A1*    1/2017    Schoenhaber ......... B01J 23/464

FOREIGN PATENT DOCUMENTS

| DE | 10 2010 046 747 A1 | 3/2011 | |
|---|---|---|---|
| DE | 10 2012 011603 A1 | 12/2013 | |
| DE | 10 2012 021573 A1 | 5/2014 | |
| DE | 10 2015 212 514 A1 | 1/2017 | |
| DE | 10 2016 206394 A1 | 10/2017 | |
| DE | 102016206394 A1 * | 10/2017 | ......... F01N 13/0093 |
| FR | 2839532 A1 | 11/2003 | |

OTHER PUBLICATIONS

Search report for German Patent Application No. 10 2017 130 886.5, dated Sep. 10, 2018.

* cited by examiner

EXHAUST GAS AFTERTREATMENT SYSTEM AND METHOD FOR EXHAUST AFTERTREATMENT OF AN INTERNAL COMBUSTION ENGINE

CROSS-REFERENCE TO RELATED APPLICATIONS

This application claims priority from German Patent Application No. 10 2017 130 886.5, filed Dec. 21, 2017, the entire contents of which are incorporated by reference.

FIELD OF THE INVENTION

The invention relates to an exhaust gas aftertreatment system for an internal combustion engine and a method for exhaust aftertreatment of an internal combustion engine according to the preambles of the respective independent claims.

SUMMARY OF THE INVENTION

The increasing stringency of exhaust emission regulations has placed high demands on automotive manufacturers, which are addressed by suitable measures to reduce uncontrolled engine emissions and appropriate exhaust aftertreatment. The EU6 legislation prescribes a particle count limit for gasoline engines, which in many cases requires use of a gasoline engine particle filter. Such soot particles arise in particular after a cold start of the internal combustion engine due to incomplete combustion, in combination with an overstoichiometric combustion air ratio and cold cylinder walls during the cold start. Thus, the cold start phase plays a crucial role in compliance with the regulatory particulate limits. During driving operation, such a gasoline engine particle filter becomes increasingly loaded with soot. This gasoline engine particle filter must be continuously or periodically regenerated to prevent excessive exhaust back pressure. The increase in exhaust back pressure may result in increased fuel consumption by the internal combustion engine, power loss, and impaired running smoothness, even misfiring. Carrying out thermal oxidation of the soot, retained in the gasoline engine particle filter, with oxygen requires a sufficiently high temperature level together with the simultaneous presence of oxygen in the exhaust gas system of the gasoline engine. Since current gasoline engines are normally operated with a stoichiometric combustion air ratio ($\lambda=1$) without excess oxygen, additional measures are necessary. Examples of such measures include increasing the temperature by adjusting the ignition angle, temporarily adjusting the gasoline engine to lean conditions, blowing secondary air into the exhaust gas system, or a combination of these measures. Thus far, adjustment of the ignition angle in the retarded direction in combination with an adjustment of the gasoline engine to lean has been preferred, since this method does not require additional components, and is able to deliver a sufficient quantity of oxygen in most operating points of the gasoline engine.

As a result of the good efficiencies in the gasoline engine, regeneration of a particle filter in the underbody position is impossible in certain operating situations, so that special driving cycles are necessary for regenerating a particle filter in the underbody position. Positioning the particle filter close to the engine is beneficial, since higher exhaust temperatures are thus present at the particle filter, and heating to a regeneration temperature is facilitated. Another problem with three-way catalytic converters having a three-way catalytically active coating, so-called four-way catalytic converters, is the fact that the coating may exhibit severe aging phenomena, so that an additional three-way catalytic converter in a position close to the engine may be necessary for conversion of the gaseous pollutants.

A method for exhaust aftertreatment of an internal combustion engine is known from DE 10 2008 036 127 A1, in which a particle filter and a three-way catalytic converter are situated in the exhaust duct of the engine. The particle filter, as a first component of the exhaust aftertreatment, is situated downstream from an outlet of the internal combustion engine. A three-way catalytic converter is situated downstream from the particle filter. In the process, the oxygen content in the exhaust gas for regenerating the particle filter is increased by lambda control of the three-way catalytic converter.

DE 10 2010 046 747 A1 discloses an exhaust gas aftertreatment system for a gasoline engine and a method for exhaust aftertreatment. A particle filter is situated downstream from a three-way catalytic converter; for regenerating the soot particles retained in the particle filter a secondary air system may be provided which blows fresh air into the exhaust gas system, downstream from the three-way catalytic converter and upstream from the particle filter.

A method and a device for exhaust aftertreatment of an internal combustion engine are known from DE 10 2015 212 514 A1, in which a three-way catalytic converter close to the engine, and downstream from the three-way catalytic converter a particle filter, are situated in the flow direction of an exhaust gas through the exhaust duct, wherein for regeneration of the particle filter, fresh air is drawn from the intake tract downstream from a compressor of the exhaust gas turbocharger and supplied to the exhaust duct downstream from the three-way catalytic converter and upstream from the particle filter.

However, a disadvantage of the known approaches is that regeneration of a particle filter in the underbody position of a motor vehicle in low-load cycles of the internal combustion engine is not possible with the methods known from the prior art.

SUMMARY OF THE INVENTION

The object of the invention is to allow partial regeneration of a four-way catalytic converter, regardless of a driving profile, and to avoid secondary emissions during the regeneration.

According to the invention, this object is achieved by an exhaust gas aftertreatment system for an internal combustion engine having an exhaust gas system that is connected to an outlet of the internal combustion engine. The exhaust gas system includes an exhaust duct in which at least one three-way catalytic converter and a four-way catalytic converter are situated. The exhaust gas aftertreatment system also includes a secondary air pump and an exhaust gas burner, wherein directly upstream from the four-way catalytic converter an introduction point is provided at which the hot exhaust gases of an exhaust gas burner of the exhaust gas aftertreatment system are introducible into the exhaust gas system. In this context, an arrangement of the introduction point directly upstream from the four-way catalytic converter is understood to mean that no further catalytically active component for exhaust gas aftertreatment is situated between the introduction point and the four-way catalytic converter. However, it is possible for a mixing path to be formed between the introduction point and the four-way catalytic converter, in which the hot exhaust gas of the exhaust gas burner can mix with the exhaust gas of the internal combustion engine before entering the four-way catalytic converter. A large quantity of energy may be introduced into the exhaust gas system via the exhaust gas burner, as the result of which the four-way catalytic converter may be heated to its regeneration temperature close in time after a regeneration request. In addition, the exhaust gas burner is utilized for heating the four-way catalytic converter during a cold start, so that the four-way catalytic converter reaches its light-off temperature close in time after a cold start and thus allows efficient conversion of pollutants. The internal combustion engine is preferably designed as an internal combustion engine that is spark-ignited by means of spark plugs according to the Otto spark ignition principle.

Advantageous enhancements and refinements of the exhaust gas aftertreatment system according to the invention for an internal combustion engine are possible as a result of the features set forth in the dependent claims.

In one preferred embodiment of the invention, it is provided that a first three-way catalytic converter close to the engine, and downstream from the three-way catalytic converter close to the engine, a four-way catalytic converter, are situated in the exhaust gas system, wherein the introduction point is provided downstream from the three-way catalytic converter close to the engine and upstream from the four-way catalytic converter. In this context, an arrangement of the three-way catalytic converter close to the engine is understood to mean an arrangement of the exhaust aftertreatment components having an exhaust gas path length of less than 80 cm, in particular less than 50 cm, particularly preferably less than 35 cm, starting from an outlet of the internal combustion engine. Accelerated heating of the three-way catalytic converter, in particular after a cold start of the internal combustion engine, is thus possible. Due to the position of the three-way catalytic converter close to the engine, less waste heat is lost through the walls of the exhaust duct, so that the three-way catalytic converter reaches its light-off temperature comparatively early after a cold start of the internal combustion engine. Since in particular with particle filters or four-way catalytic converters in the underbody position, the regeneration temperatures necessary for oxidation of the soot are not reached in low-load driving cycles, in these arrangements it is particularly advantageous to situate an exhaust gas burner upstream from the four-way catalytic converter or the particle filter in order to provide a heating option independent of the exhaust gas of the internal combustion engine. In addition, effective component protection may be achieved due to the temperature regulation via the exhaust gas burner, since the risk of uncontrolled soot burnoff on the four-way catalytic converter or the particle filter is avoided on account of the generally lower temperatures in the underbody position. The risk of thermal damage to the four-way catalytic converter or to the particle filter may thus be effectively reduced.

In one advantageous embodiment, it is provided that a further three-way catalytic converter is situated downstream from the four-way catalytic converter. Due to the three-way catalytic converter, secondary emissions during the oxidation of the soot on the four-way catalytic converter or emissions resulting from control deviations in the lambda control may be eliminated, thus making a further reduction in the emissions possible.

According to one preferred embodiment of the invention, it is provided that in the exhaust duct a first lambda probe is situated upstream from the three-way catalytic converter close to the engine, and a second lambda probe is situated directly upstream from the four-way catalytic converter. The lambda control of the internal combustion engine as well as the control of the exhaust gas burner may thus take place with a pair of lambda probes. A short gas travel time from the exit of the exhaust gas burner to the second lambda probe is advantageous, and allows particularly rapid regulation of the combustion air ratio of the exhaust gas burner. The first lambda probe is preferably designed as a broadband lambda probe to allow a quantitative conclusion concerning the oxygen content in the exhaust gas. The second lambda probe may be designed as a jump lambda probe to reduce the costs and thus provide a qualitative conclusion concerning excess oxygen in the exhaust gas. Alternatively, the second lambda probe may also be designed as a broadband probe to allow quantitative regulation of the combustion air ratio of the exhaust gas burner.

Alternatively, it is advantageously provided that a first lambda probe is situated upstream from the first three-way catalytic converter close to the engine, and a second lambda probe is situated downstream from the four-way catalytic converter. This variant has the advantage that it results in better intermixing of the burner gas and the exhaust gas of the internal combustion engine, and an evaluation of the tailpipe emissions of the internal combustion engine is possible.

One embodiment variant is particularly preferred in which a first lambda probe is situated upstream from the three-way catalytic converter close to the engine, a second lambda probe is situated directly upstream from the four-way catalytic converter, and a third lambda probe is situated downstream from the four-way catalytic converter. This embodiment combines the advantages of the two previously described embodiments with a slight increase in cost and increased complexity of the exhaust gas aftertreatment system.

In one preferred embodiment, it is advantageously provided that a mixing path having a length of at least 30 cm, preferably at least 50 cm, is formed between the introduction point and the four-way catalytic converter. This allows better intermixing of the exhaust gases of the exhaust gas burner and of the internal combustion engine before entering the four-way catalytic converter, as the result of which improved lambda control for the exhaust aftertreatment is possible. The emissions may be further reduced in this way.

In one preferred embodiment of the exhaust gas aftertreatment system, it is provided that the secondary air pump is connected to the exhaust gas burner via an air line. The combustion air ratio of the exhaust gas burner may thus be adjusted, and correspondingly clean and low-emission combustion at the exhaust gas burner may be ensured. In addition, the secondary air pump in the regeneration phases of the four-way catalytic converter or of the particle filter, in which the combustion gas feed to the exhaust gas burner is deactivated, can introduce the oxygen that is necessary for oxidizing the soot retained in the four-way catalytic converter or in the particle filter. This has the advantage that only one introduction point is provided at the exhaust duct. Alternatively, the secondary air pump may also be directly connected to the exhaust duct upstream from the four-way catalytic converter via a second air line.

According to one preferred, advantageous embodiment of the invention, it is provided that the exhaust gas burner is operable with a variable combustion air ratio. The exhaust gas burner can thus compensate for lambda fluctuations, in particular understochiometric lambda operation in the cold start phase of the internal combustion engine, and thus provide a stoichiometric exhaust gas downstream from the introduction point for the hot burner gases of the exhaust gas burner.

It is particularly preferred when a stoichiometric exhaust gas is adjusted downstream from an introduction point of the exhaust gas burner. A stoichiometric exhaust gas allows particularly efficient exhaust aftertreatment at a three-way catalytic converter or four-way catalytic converter situated downstream from the introduction point.

According to the invention, a method for exhaust aftertreatment of an internal combustion engine, in particular an internal combustion engine that is spark-ignited by means of spark plugs according to the Otto spark ignition principle, having an exhaust gas aftertreatment system according to the invention is proposed which includes the following steps:

heating the four-way catalytic converter to a regeneration temperature by introducing hot burner gases of the exhaust gas burner, wherein a stoichiometric exhaust gas is adjusted downstream from the four-way catalytic converter or downstream from the second three-way catalytic converter, switching off the exhaust gas burner and blowing in secondary air upstream from the four-way catalytic converter, wherein the soot that is retained in the four-way catalytic converter is oxidized by overstoichiometric exhaust gas.

operating the internal combustion engine with an understoichiometric combustion air ratio, wherein the oxygen stored in the oxygen store of the four-way catalytic converter during the phase of blowing in secondary air is essentially evacuated.

Essentially evacuating the oxygen store is understood to mean a maximum oxygen quantity of at most 25%, in particular at most 15%, particularly preferably at most 10%, of the storage capacity.

Use of a method according to the invention allows regeneration of the four-way catalytic converter, in particular in an arrangement in an underbody position of a motor vehicle, essentially independently of the load state of the internal combustion engine and independently of the loading state of the four-way catalytic converter. During a cold start, in which the four-way catalytic converter is heated by means of the exhaust gas burner, subsequent to such a heating phase a partial regeneration of the four-way catalytic converter is carried out. The four-way catalytic converter may thus be partially regenerated even in typical low-load traffic, such as in city traffic or in short-distance operation, when regeneration using solely engine-based measures is not possible. In addition, the emissions of the internal combustion engine may also be effectively reduced during the regeneration of the particle filter or of the four-way catalytic converter, since exhaust gas cleaning by the three-way catalytic converter takes place, and during the blowing in of secondary air the burner is switched off, thus minimizing secondary emissions during regeneration of the four-way catalytic converter. The understoichiometric operation of the internal combustion engine following the regeneration phase ensures that lean breakthrough through the four-way catalytic converter does not occur, and thus, the exhaust gas components to be reduced, in particular nitrogen oxides, can no longer be converted. It is preferred when, in the phase of the understoichiometric operation, the internal combustion engine is operated with a combustion air ratio of $0.9<\lambda<0.98$, on the one hand to deliver a sufficient quantity of uncombusted hydrocarbons for evacuating the oxygen store, and on the other hand to avoid an increase in secondary emissions.

In one preferred embodiment of the method for exhaust aftertreatment, it is provided that the mixture lambda of the exhaust gas-to-air ratio and the blown-in secondary air in the regeneration phase is between 1.05 and 1.2. In this way, on the one hand thermal damage to the four-way catalytic converter due to uncontrolled soot burnoff is avoided, and on the other hand, the blowing in of secondary air does not result in excessive cooling of the four-way catalytic converter, so that the regeneration does not end too soon.

In one preferred embodiment of the method, it is provided that a regeneration phase of the four-way catalytic converter is initiated after each active heating phase of the four-way catalytic converter, in which the four-way catalytic converter is heated by the exhaust gas burner. The pressure sensors for measuring the differential pressure across the four-way catalytic converter may thus possibly be dispensed with, since regeneration based on a loading model or a differential pressure measurement is not necessary when partial regeneration of the four-way catalytic converter takes place in each active heating phase.

The various embodiments of the invention mentioned in the present patent application, unless stated otherwise in the individual case, may advantageously be combined with one another.

BRIEF DESCRIPTION OF THE DRAWINGS

The invention is explained below in exemplary embodiments, with reference to the associated drawings. Identical components or components having an identical function are denoted by the same reference symbols in the various figures, which show the following.

DETAILED DESCRIPTION OF THE INVENTION

Figure 1:
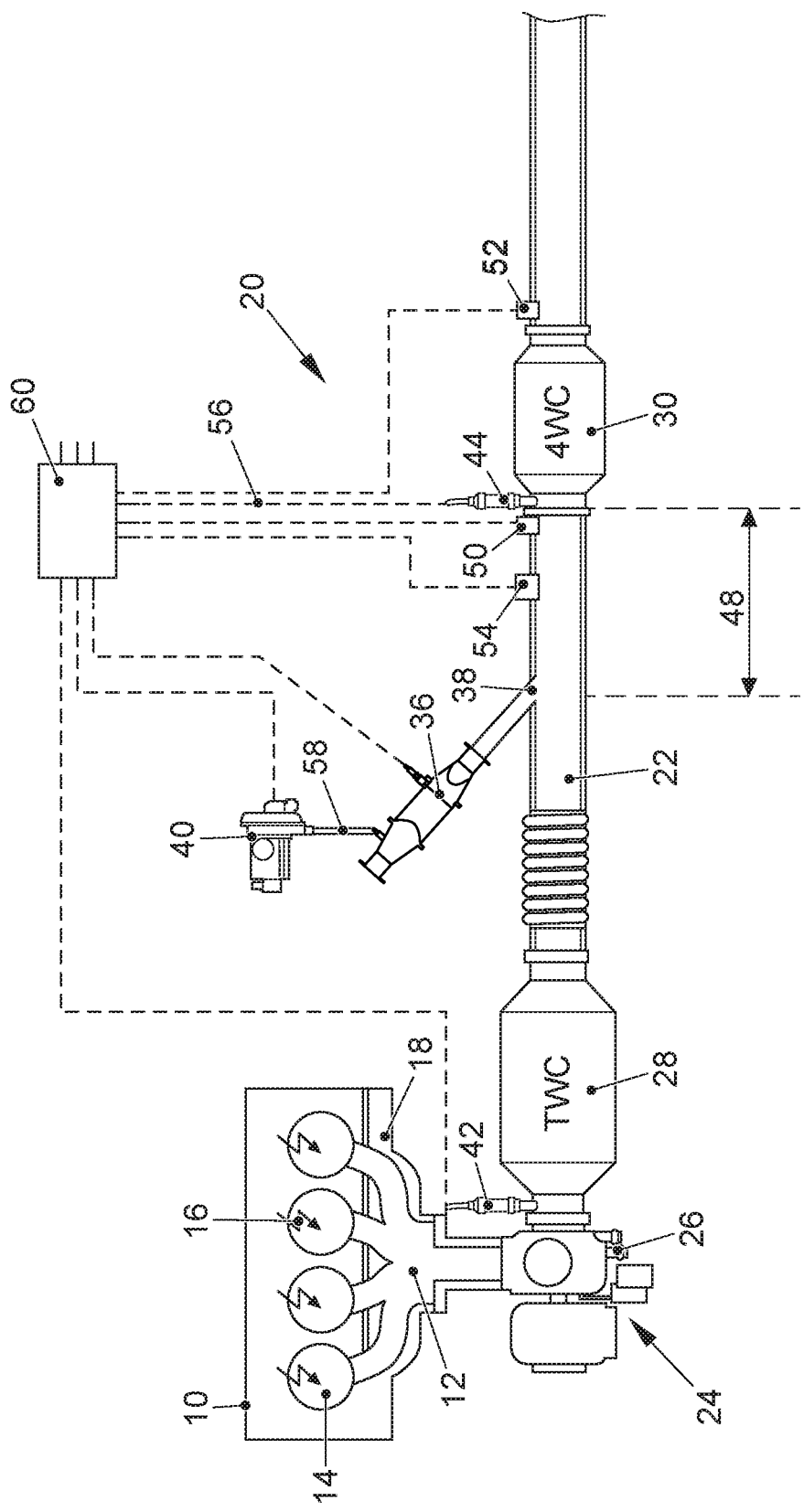
FIG. 1 shows a first exemplary embodiment of an internal combustion engine having an exhaust gas aftertreatment system according to the invention.

FIG. 1 shows a schematic illustration of an internal combustion engine 10 whose outlet 12 is connected to an exhaust gas system 20. The internal combustion engine 10 is designed as a gasoline engine that is spark-ignited by means of spark plugs 16, and that has multiple combustion chambers 14. The internal combustion engine 10 is preferably designed as an internal combustion engine 10 that is charged by means of an exhaust gas turbocharger 24, with a turbine 26 of the exhaust gas turbocharger 24 situated downstream from the outlet 12 and upstream from the first emission-reducing exhaust aftertreatment component, in particular upstream from a three-way catalytic converter 28 close to the engine. The exhaust gas system 20 includes an exhaust duct 22 in which a three-way catalytic converter 28 close to the engine is situated in the flow direction of an exhaust gas through the exhaust duct 22, and a four-way catalytic converter 30 is situated downstream from the three-way catalytic converter 28 close to the engine. The three-way catalytic converter 28 close to the engine is situated at a distance of less than 80 cm exhaust gas path length, in particular less than 50 cm exhaust gas path length, beginning at the outlet 12 of the internal combustion engine 10. The four-way catalytic converter 30 is preferably situated in the underbody position of a motor vehicle, and thus in a position remote from the engine, i.e., at a distance of greater [than] 100 cm exhaust gas path length, beginning at the outlet 12 of the internal combustion engine 10. Downstream from the first three-way catalytic converter 28 close to the engine and upstream from the four-way catalytic converter 30, an introduction point 38 for hot exhaust gases of an exhaust gas burner 36 is provided, via which the four-way catalytic converter 30 situated downstream from the introduction point 38 may be heated independently of the operating situation of the internal combustion engine 10. The introduction point 38 is spaced apart from the four-way catalytic converter 30, so that a mixing path 48, in which the hot burner gas mixes with the exhaust gas of the internal combustion engine 10, results between the introduction point 38 and the inlet of the four-way catalytic converter 30.

Further catalytic converters, in particular a further three-way catalytic converter 34, a NOx storage catalytic converter, or a catalytic converter for selective catalytic reduction of nitrogen oxides may additionally be situated in the exhaust gas system 20. Situated in the exhaust duct 22, upstream from the first three-way catalytic converter 28, is a first lambda probe 42 with which the oxygen content $\lambda_1$ of the exhaust gas downstream from the outlet 12 and upstream from the first exhaust aftertreatment component, i.e., the first three-way catalytic converter 28 close to the engine, may be determined. Situated in the exhaust duct 22, downstream from the introduction point 38 and upstream from the four-way catalytic converter 30, is a second lambda probe 44 with which the oxygen content $\lambda_2$ in the exhaust duct 28 directly upstream from the four-way catalytic converter 30 may be determined. The first lambda probe 42 is preferably designed as a broadband lambda probe, and is connected to a control unit 60 of the internal combustion engine 10 via a first signal line 56. The second lambda probe 44 is preferably designed as a jump probe, and is connected to the control unit 60 via a second signal line 56. The first lambda probe 42 and the second lambda probe 44 form a sensor system with which the combustion air ratio $\lambda$ of the internal combustion engine 10 and of the exhaust gas burner 36 may be regulated. In addition, on-board diagnosis of the first three-way catalytic converter 28 may take place via the sensor system.

A secondary air pump 40 is connected to the exhaust gas burner 36 via a secondary air line 58. A secondary air valve with which the air supply to the exhaust gas burner 36 may be provided and interrupted may be situated in the secondary air line 44. In addition, pressure sensors 50, 52 may be provided upstream and downstream from the four-way catalytic converter 30, and may carry out a differential pressure measurement across the four-way catalytic converter 30 to determine the loading state of the four-way catalytic converter 30. Furthermore, on-board diagnosis of the four-way catalytic converter 30 may take place via the pressure sensors 50, 52. The secondary air pump 40 may be additionally connected to a further introduction point at the exhaust duct 22 via a further secondary air line, so that the secondary air may be introduced into the exhaust duct 22 independently of the exhaust gas burner 36. In addition, even further sensors, in particular a temperature sensor 54 or a NOx sensor, may be situated in the exhaust gas system 20 to control the combustion of the internal combustion engine 10 and/or of the exhaust gas burner 36.

In one variant of the exhaust gas aftertreatment system, the second lambda probe 44 is situated downstream from the four-way catalytic converter 30, thus allowing determination of the exhaust gas-to-air ratio downstream from the four-way catalytic converter 30. The advantage of this variant is that there is better intermixing of the burner gas and the exhaust gas of the internal combustion engine 10, and an evaluation of the tailpipe lambda value is possible. A disadvantage of this variant, however, is that the signal has increased inertia due to the oxygen storage capability of the four-way catalytic converter 30, wherein any control deviation of the lambda control directly results in increased tailpipe emissions.

In another variant of the exhaust gas aftertreatment system, a second lambda probe 44 in this variant is provided directly upstream from the four-way catalytic converter 30, and a third lambda probe 46 is provided downstream from the four-way catalytic converter 30. This variant has the advantage that the benefits of the two previously mentioned variants may be combined with one another. However, it is disadvantageous that the complexity of the control and the costs increase due to an additional lambda probe.

Figure 2:
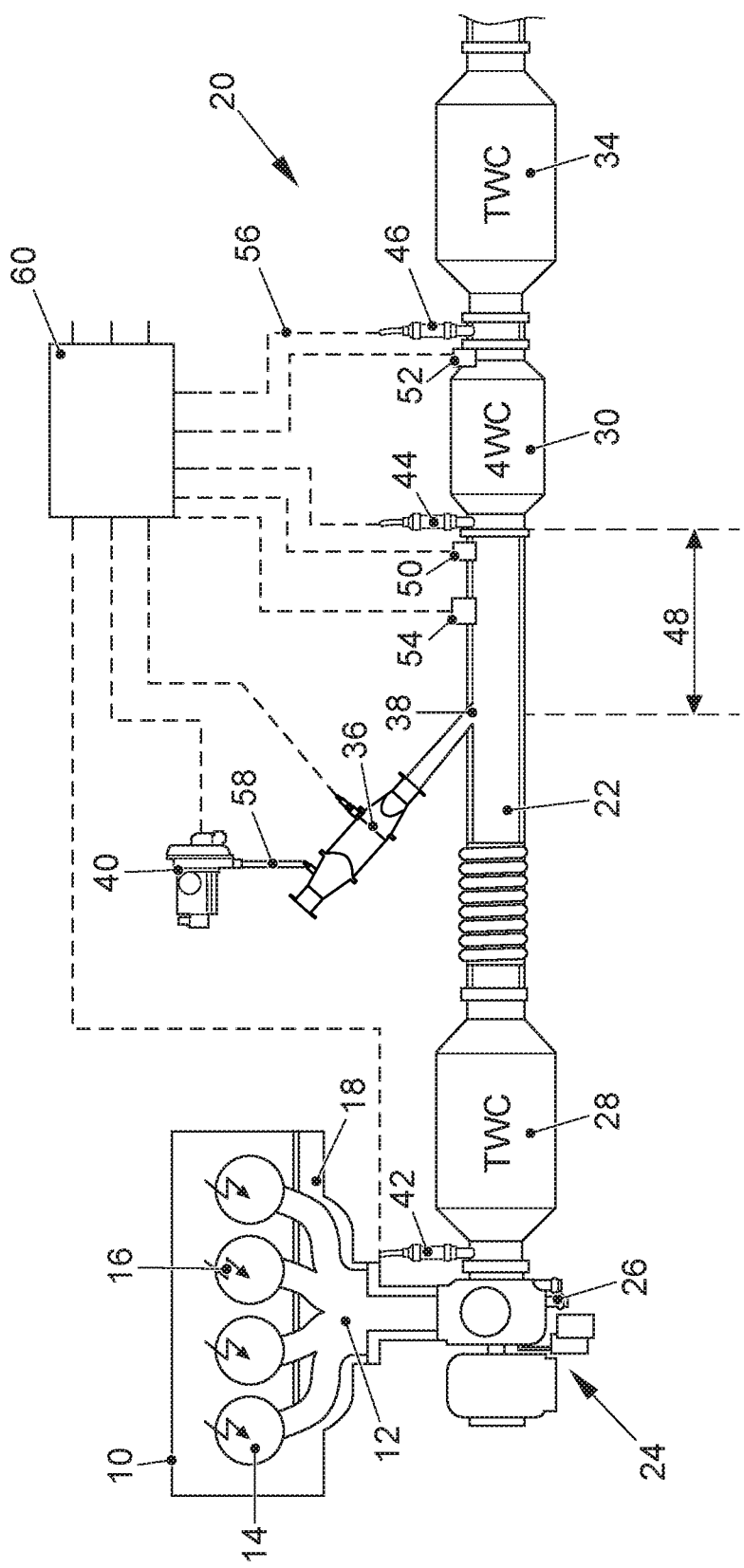
FIG. 2 shows a second exemplary embodiment of an internal combustion engine having an exhaust gas aftertreatment system according to the invention, wherein the exhaust gas aftertreatment system additionally has a further three-way catalytic converter, downstream from the four-way catalytic converter, in the underbody position.

FIG. 2 illustrates another exemplary embodiment of an internal combustion engine 10 having an exhaust gas aftertreatment system according to the invention. With essentially the same design as in FIG. 1, a further three-way catalytic converter 34 is situated in the exhaust duct 22, downstream from the four-way catalytic converter 30. The goal of stoichiometric tailpipe exhaust gas during operation of the exhaust gas burner 36 may thus be more easily achieved, since a further component having an oxygen store is present. Lambda breakthroughs through the four-way catalytic converter 30 may thus be compensated for by the oxygen storage capability of the three-way catalytic converter 34 situated downstream from the four-way catalytic converter 30. This results in further improvement in the tailpipe emissions.

Figure 3:
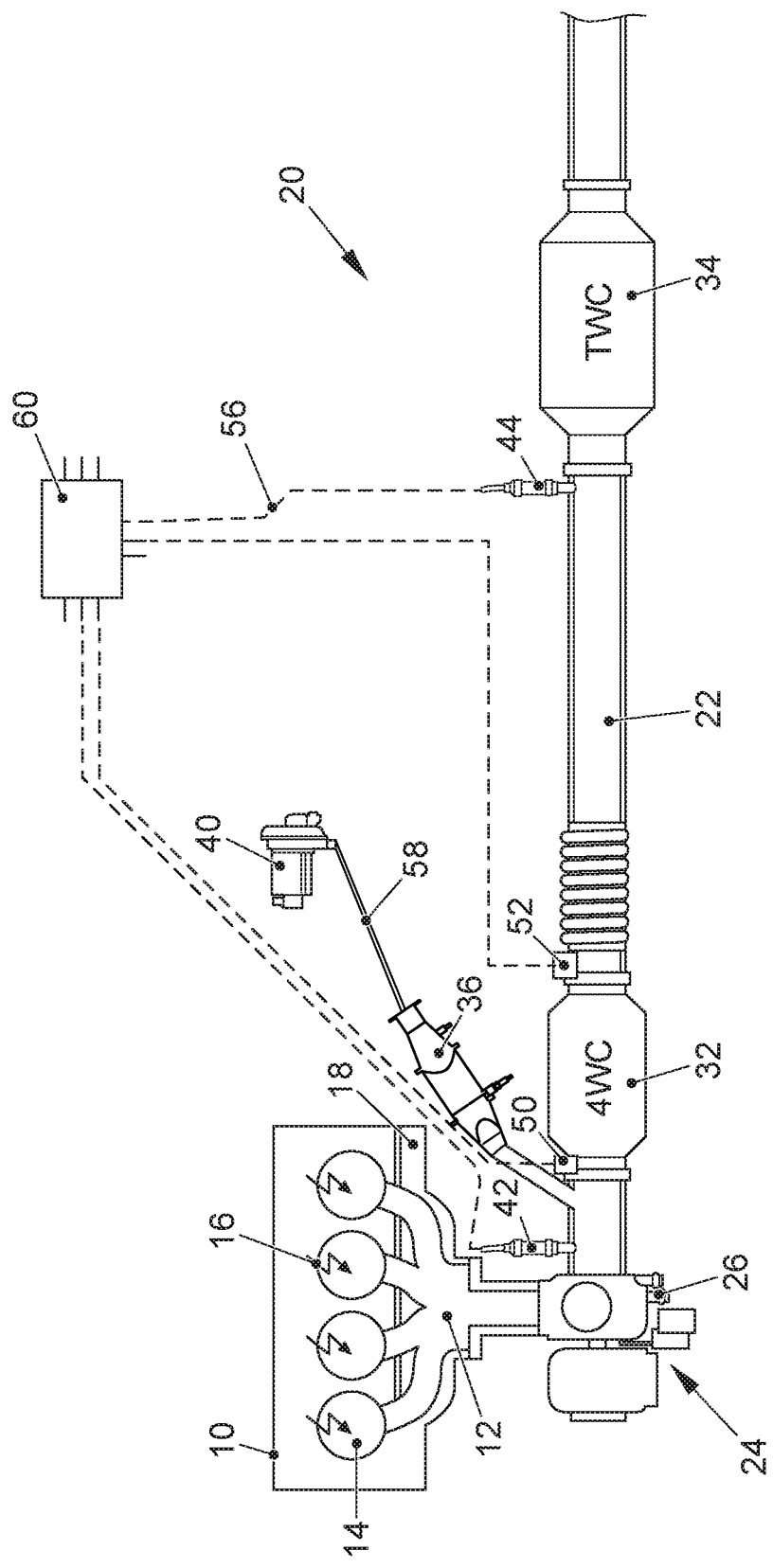
FIG. 3 shows a third exemplary embodiment of an internal combustion engine having an exhaust gas aftertreatment system according to the invention, having a four-way catalytic converter close to the engine and a three-way catalytic converter downstream from the four-way catalytic converter.

FIG. 3 illustrates another exemplary embodiment of an internal combustion engine 10 according to the invention. With essentially the same design as in FIGS. 1 and 2, instead of a three-way catalytic converter 28 close to the engine and a four-way catalytic converter 30 in the underbody position, a four-way catalytic converter 32 close to the engine and a three-way catalytic converter 34, downstream from this four-way catalytic converter 32 close to the engine, are situated in the underbody position of a motor vehicle. This exemplary embodiment has the advantage that rapid light-off of the four-way catalytic converter 32 is achieved. Operation in the lean phase, with overstoichiometric exhaust gas by blowing in secondary air, can then take place only until the oxygen store (OSC) on the three-way catalytic converter 34 is sufficient to receive the excess oxygen in order to avoid a lean breakthrough through the three-way catalytic converter 34. An increase in the exhaust gas components to be reduced, in particular nitrogen oxides, may be avoided in this way. However, one disadvantage of such an approach is that the duration of the lean phase is limited by the oxygen storage capability of the three-way catalytic converter 34. In addition, the durability of the four-way catalytic converter 32 close to the engine is limited.

Figure 4:
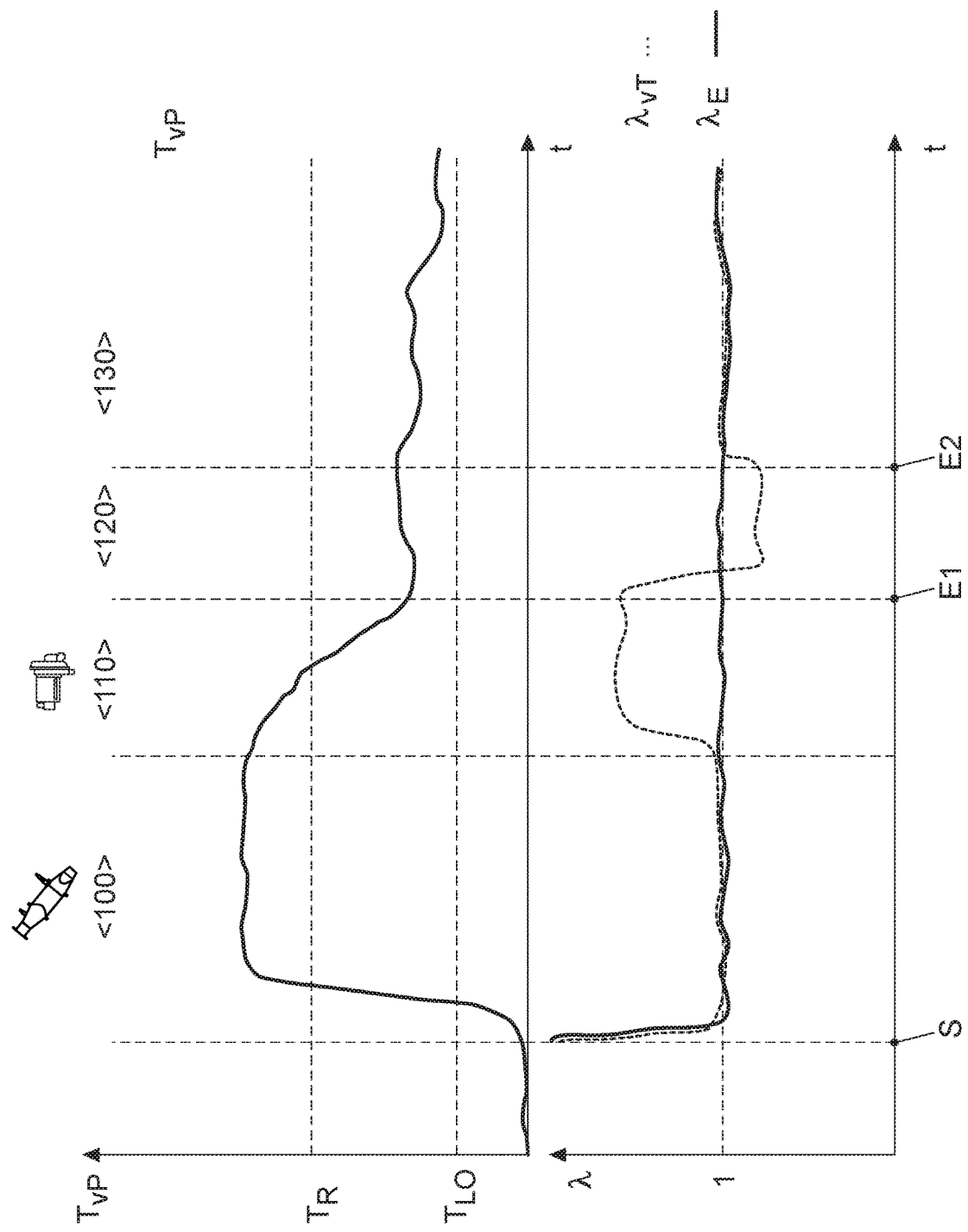
FIG. 4 shows a diagram illustrating the variation of temperature over time and the exhaust gas-to-air ratio in the exhaust gas system while carrying out a method according to the invention for exhaust aftertreatment.

FIG. 4 illustrates the variation of temperature over time upstream from the four-way catalytic converter 30 while carrying out a method according to the invention for exhaust aftertreatment. In addition, FIG. 4 shows the exhaust gas-to-air ratio λ upstream from the three-way catalytic converter 28 close to the engine ($\lambda_{vT}$) and downstream from the last catalytically active component 30, 34 of the exhaust gas aftertreatment system ($\lambda_E$). In a first method step <100>, after the motor start S the internal combustion engine 10 is heated by the waste heat of the internal combustion engine 10, and concurrently by the exhaust gas burner 36. In this method step <100>, the internal combustion engine 10 is operated with a stoichiometric combustion air ratio (λ=1), and is adjusted to a stoichiometric exhaust gas-to-air ratio $\lambda_E$ downstream from the last catalytically active exhaust aftertreatment component 30, 34. The heating phase is maintained until the four-way catalytic converter 30 has reached a temperature above the regeneration temperature $T_R$ for oxidizing the soot retained in the four-way catalytic converter 30. In a method step <110> the exhaust gas burner 36 is switched off, and secondary air is blown into the exhaust duct 22 upstream from the four-way catalytic converter 30. The quantity of secondary air is to be set in such a way that the mixture lambda with stoichiometric operation of the engine and secondary air blowing is in the range of $1.05<\lambda_{vT}<1.2$. In this way, thermal damage to the four-way catalytic converter 30 due to uncontrolled soot burnoff and excessive cooling of the four-way catalytic converter 30 are avoided. Secondary air is blown in until the temperature of the four-way catalytic converter 30 drops below the regeneration temperature $T_R$ and partial regeneration of the four-way catalytic converter 30 has taken place. At the end El of method step <110>, the secondary air blowing is switched off. Since the oxygen store (OSC) of the four-way catalytic converter is completely full at this point in time, following the secondary air blowing, in a method step <120> the internal combustion engine 10 is operated with an understoichiometric, rich combustion air ratio λ<1 in order to at least partially evacuate the oxygen store (OSC). This method step <120> is terminated at a point in time E2, before a rich breakthrough through the four-way catalytic converter 30 occurs. The control preferably takes place based on a model, so that a small residual loading of at least 5% of the oxygen store (OSC) remains and a rich breakthrough is avoided. In a method step <130> the internal combustion engine 10 is subsequently operated with a stoichiometric combustion air ratio λ=1, resulting in conversion of the pollutants, present in the exhaust gas, by the catalytic converters 28, 30, 32, 34. The method according to the invention is preferably carried out without assessing the soot loading of the four-way catalytic converter 30 after each heating phase of the exhaust gas burner 36.

In summary, it may be concluded that by use of an exhaust gas aftertreatment system according to the invention and the described method according to the invention, partial regeneration of the four-way catalytic converter 30 may be carried out, regardless of the driving cycles and regardless of the loading of the four-way catalytic converter 30. The regeneration of the four-way catalytic converter 30 thus takes place in an emission-neutral manner, and does not result in an increase in secondary emissions.

LIST OF REFERENCE SYMBOLS 10 internal combustion engine
12 outlet
14 combustion chamber
16 spark plug
18 cylinder head
20 exhaust gas system
22 exhaust duct
24 exhaust gas turbocharger
26 turbine
28 three-way catalytic converter close to the engine
30 four-way catalytic converter
32 four-way catalytic converter close to the engine
34 second three-way catalytic converter
36 exhaust gas burner
38 introduction point
40 secondary air pump
42 first lambda probe
44 second lambda probe
46 third lambda probe
48 mixing path
50 first pressure sensor
52 second pressure sensor
54 temperature sensor
56 signal line
58 air line
60 control unit
<100> start phase of the internal combustion engine with active exhaust gas burner
<110> regeneration phase of the four-way catalytic converter
<120> evacuation of the oxygen store of the four-way catalytic converter
<130> stoichiometric normal operation of the internal combustion engine
E1 end of the secondary air blowing
E2 end of the rich adjustment of the engine
S starting of the internal combustion engine
$T_{vP}$ temperature upstream from the four-way catalytic converter
$T_R$ regeneration temperature of the four-way catalytic converter
$T_{LO}$ light-off temperature of the four-way catalytic converter
$\lambda_{vT}$ exhaust gas-to-air ratio upstream from the catalytic converter close to the engine
$\lambda_E$ exhaust gas-to-air ratio downstream from the last catalytically active exhaust aftertreatment component

The invention claimed is:

1. A method for exhaust aftertreatment of an internal combustion engine having an exhaust gas aftertreatment system, comprising an exhaust gas system that is connectable to an outlet of the internal combustion engine, wherein the exhaust gas system includes an exhaust duct in which a four-way catalytic converter, a first three-way catalytic converter and a second three-way catalytic converter are situated, and an introduction point, directly upstream from the four-way catalytic converter, at which the hot exhaust gases of an exhaust gas burner of the exhaust gas aftertreatment system are introducible into the exhaust gas system for heating the four-way catalytic converter, the method comprising the following steps:

heating the four-way catalytic converter to a regeneration temperature ($T_R$) by introducing hot burner gases of the exhaust gas burner, wherein a stoichiometric exhaust gas is adjusted downstream from the four-way catalytic converter or downstream from the second three-way catalytic converter, switching off the exhaust gas burner and blowing in secondary air upstream from the four-way catalytic converter, wherein soot that is retained in the four-way catalytic converter is oxidized by overstoichiometric exhaust gas ($\lambda>1$), and operating the internal combustion engine with an understochiometric combustion air ratio ($\lambda<1$), wherein oxygen stored in an oxygen store (OSC) of the four-way catalytic converter during the phase of blowing in secondary air is essentially evacuated.

2. The method according to claim 1, further comprising intermixing the hot exhaust gases of the exhaust gas burner and exhaust gases of the internal combustion engine; wherein a mixing path has a length of at least 30 cm and is formed between the introduction point and the four-way catalytic converter.

3. The method for exhaust aftertreatment according to claim 1, wherein a mixture lambda $\lambda_{vT}$ of an exhaust gas-to-air ratio and the secondary air in a regeneration phase is $1.05<\lambda_{vT}<1.2$.

4. The method for exhaust aftertreatment according to claim 1, wherein a regeneration phase of the four-way catalytic converter is initiated after each active heating phase of the exhaust gas burner.

5. The method according to claim 1, wherein the four-way catalytic converter is situated in the exhaust gas system downstream from the first three-way catalytic converter; and the introduction point is provided downstream from the first three-way catalytic converter.

6. The method according to claim 5, wherein the second three-way catalytic converter is situated in the exhaust gas system downstream from the four-way catalytic converter.

7. The method according to claim 5,
wherein a first lambda probe is situated upstream from the first three-way catalytic converter; a second lambda probe is situated directly upstream from the four-way catalytic converter;

the method further comprising determining there is the understochiometric combustion air ratio ($\lambda<1$) based on measurements of the first lambda probe and the second lambda probe.

8. The method according to claim 5,
wherein a first lambda probe is situated upstream from the first three-way catalytic converter, and a second lambda probe is situated downstream from the four-way catalytic converter;

the method further comprising determining there is the understochiometric combustion air ratio ($\lambda<1$) based on measurements of the first lambda probe and the second lambda probe.

9. The method according to claim 5,
wherein a first lambda probe is situated upstream from the first three-way catalytic converter, a second lambda probe is situated directly upstream from the four-way catalytic converter, a third lambda probe is situated downstream from the four-way catalytic converter, the method further comprising determining there is the understochiometric combustion air ratio ($\lambda<1$) based on measurements of the first lambda probe, the second lambda probe, and the third lambda probe.

* * * * *